F. ELLIS.
AUTOMOBILE BUMPER.
APPLICATION FILED JULY 20, 1920.
1,396,628.
Patented Nov. 8, 1921.
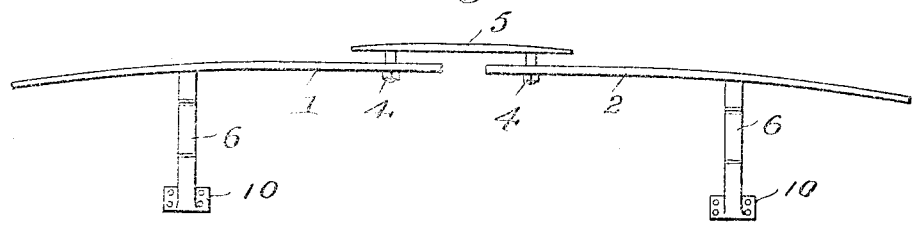
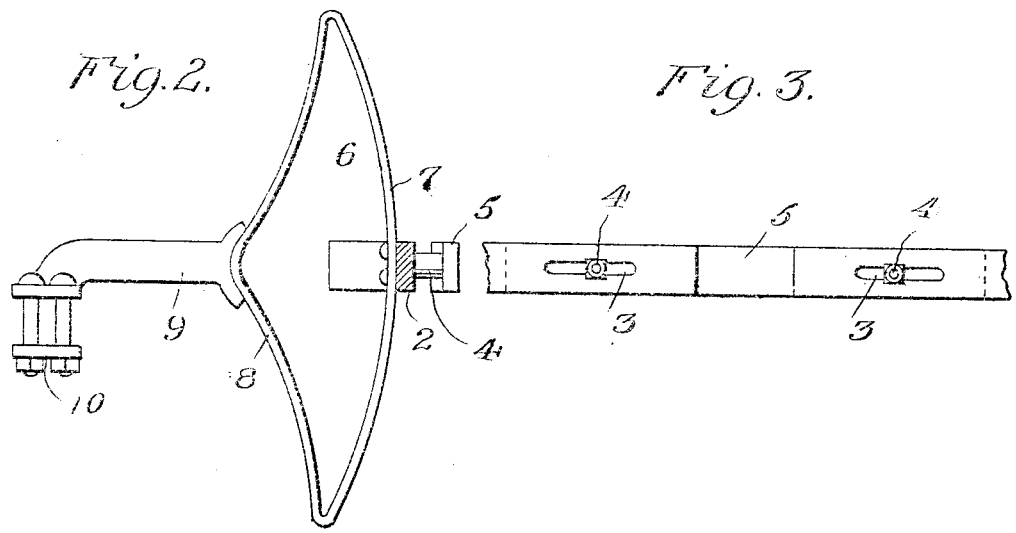
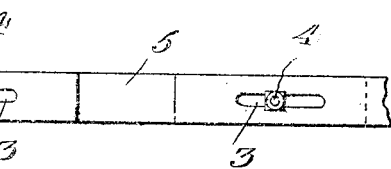
Frank Ellis
INVENTOR
BY Victor J. Evans
ATTORNEY

UNITED STATES PATENT OFFICE.

FRANK ELLIS, OF AMES, IOWA.

AUTOMOBILE-BUMPER.

1,396,628.

Specification of Letters Patent. Patented Nov. 8, 1921.

Application filed July 20, 1920. Serial No. 397,581.

*To all whom it may concern:*

Be it known that I, FRANK ELLIS, a citizen of the United States, residing at Ames, in the county of Story and State of Iowa, have invented new and useful Improvements in Automobile-Bumpers, of which the following is a specification.

This invention relates to an automobile bumper and has for its primary object the construction of a bumper that may be adjusted to be readily connected to automobiles of various widths.

An object of the invention is the novel manner of arranging the springs with relation to the bars so that the bumper will positively engage a colliding automobile so as to prevent damage to the machine to which my improved bumper is attached.

A feature of the invention is the novel arrangement and association of parts so that the bumper extends in two directions so as to insure engagement of the bumper with an object.

With these and other objects in view the invention will be better understood from the following detailed description taken in connection with the accompanying drawing wherein:

Figure 1 is a top plan view of my bumper constructed in one of its forms.

Fig. 2 is a sectional view.

Fig. 3 is a detailed view.

Again referring to the drawing illustrating one construction of my invention the numerals 1 and 2 designate end bars, which may be of any shape or construction. Each end bar is provided with a slot 3 having adjustable connection with the bolt 4 connected to the central bar 5. Thus it will be be seen that the bars may be adjustable for accommodating different width automobiles. Each end bar has rigidly secured thereto upright spring 6 shaped to have a front curved portion 7 and rear curved portion 8. The rear curved portion is rigidly secured to the clamping arm 9 including the clip 10 that is directly connected to the frame of the automobile.

From the foregoing description it will be seen that I provide a bumper that can be readily adjusted and which will have the maximum amount of resiliency and besides will project in directions to insure proper engagement thereof with a colliding object.

It is, of course, to be understood that the invention may be constructed in various other manners and the parts associated in different relations and, therefore, I do not desire to be limited in any manner except as set forth in the claim hereunto appended.

Having thus described my invention what I claim is:

An automobile bumper comprising curved end bars, each provided with a slot adjacent one end, a solid central bar, bolts projecting from the central bar and adjustably mounted in said slots, vertically extending springs connected at a central point to said end bars and each having a curved front and rear portion, and clamping arms for the springs.

In testimony whereof I affix my signature.

FRANK ELLIS.